Patented June 24, 1930

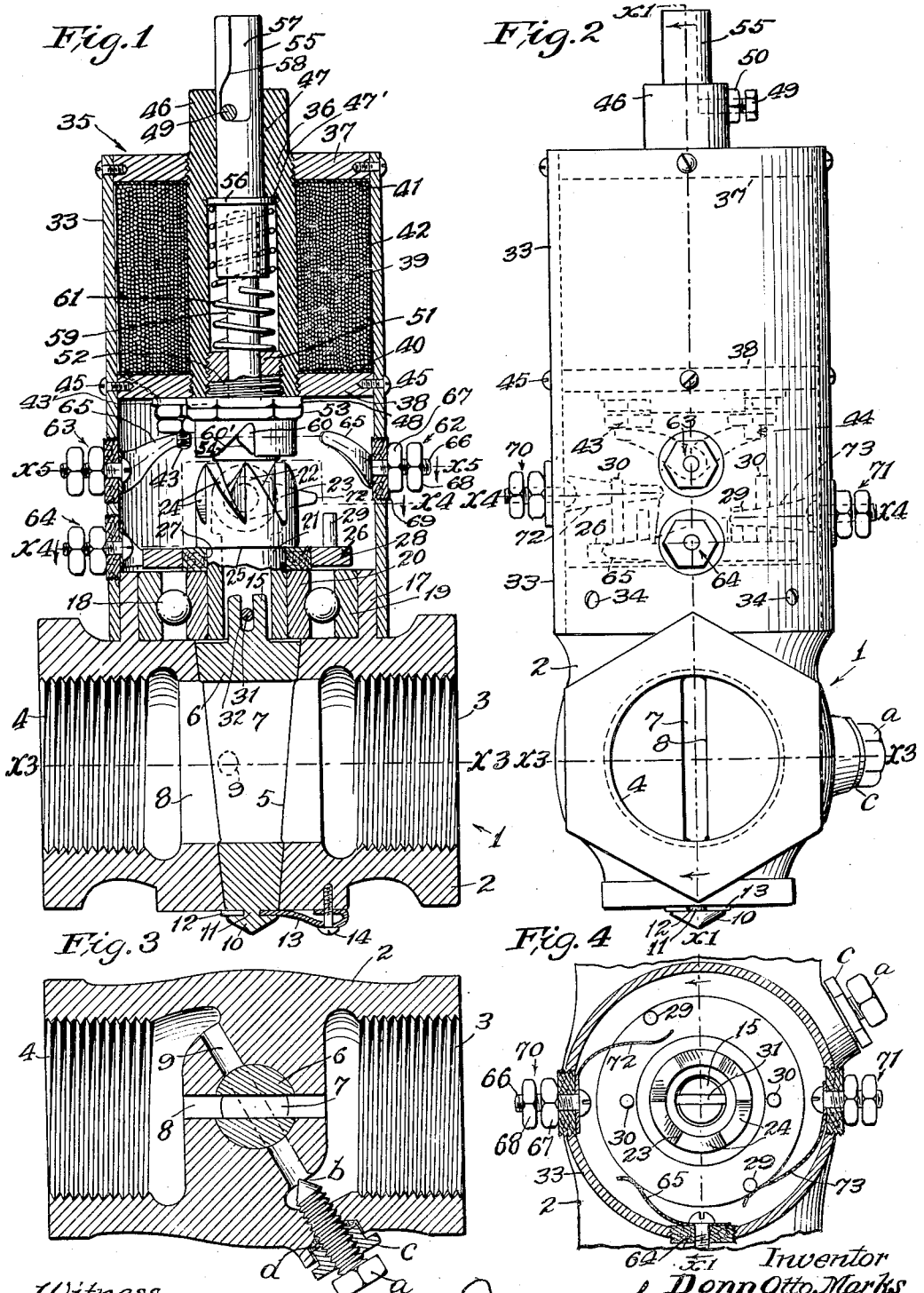

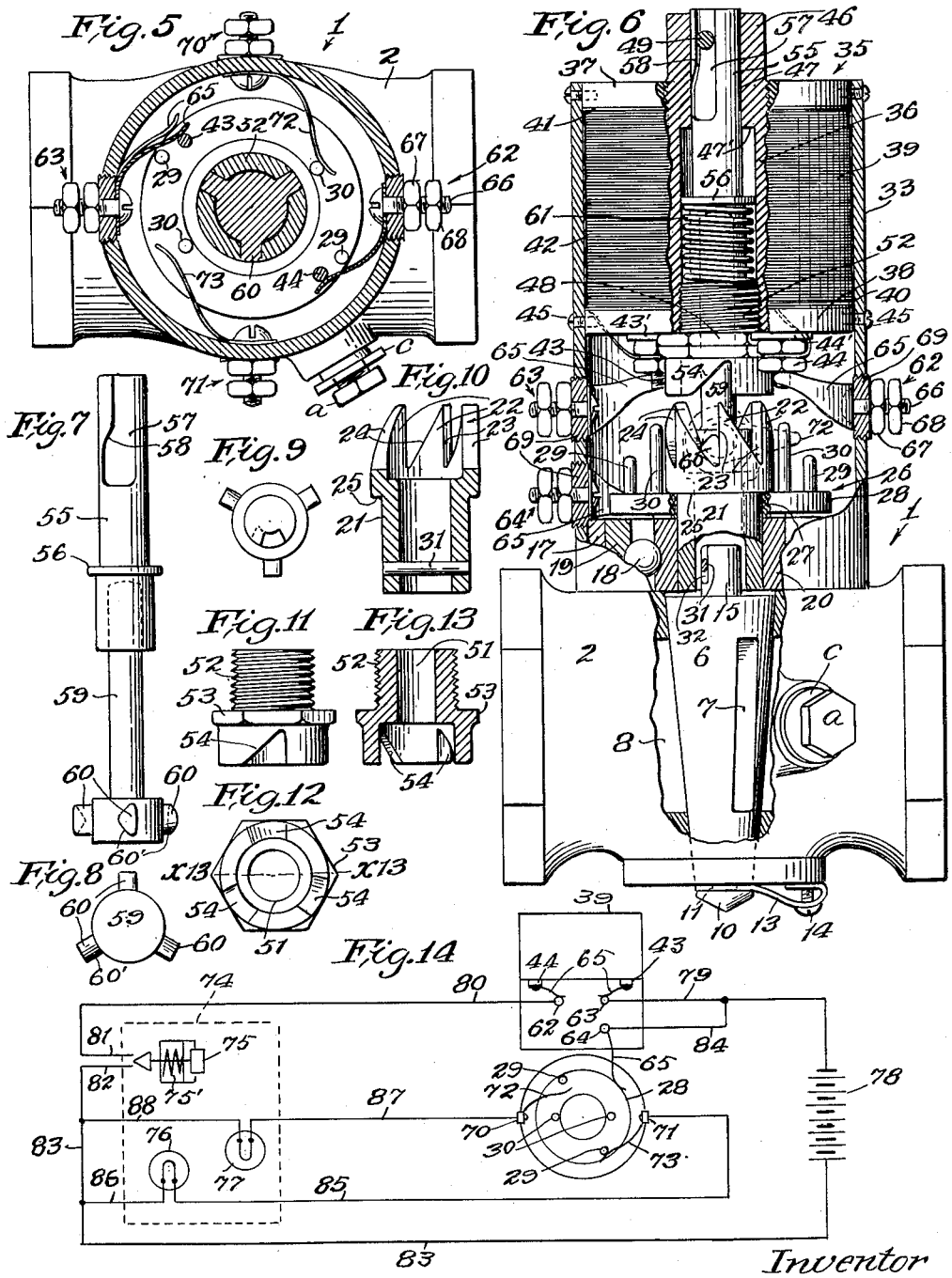

1,765,377

UNITED STATES PATENT OFFICE

DONN OTTO MARKS, OF LOS ANGELES, CALIFORNIA, ASSIGNOR TO GEORGE GARTLING, OF LOS ANGELES, CALIFORNIA

MAGNETIC VALVE

Application filed May 28, 1923. Serial No. 641,950.

This invention relates to means for controlling the flow of producer gas or other combustible gases to furnaces, stoves, radiators, boilers, water heaters, and the like, which are generally mounted in an out-of-the-way place such as in the basement of a house. Such means comprise a valve operated by operation of a push button connected by electric wires to said valve, and mounted a predetermined distance from said valve, or say, at any convenient location, in the living room of a house. The operation of such valves is generally and preferably to turn the same to full open position, low flame position, or off position.

An object of this invention is to provide a valve of the character set forth which will be compact and easy to assemble.

An object is to provide a valve of this character which can be connected to the wires of an electric circuit with maximum ease; this I accomplish by placing the electric terminals on the outside of the valve.

An object is positive operation of the valve.

An object is to provide means which will indicate to the operator at a distance from the valve the position of such valve.

An object is to provide means for adapting the valve to various grades or pressures of gas when the same is turned to low position.

An object is to provide a simple device of this character which can be operated with a minimum amount of electric current, and thereby reduce the expense of obtaining a higher voltage current for operation.

Another object is to provide a valve of this character which is always operated or turned in the same rotary direction, that is, when the valve is turned to high, low, or off position the valve is turned in the same direction.

Another object is to provide a valve which can be manually operated independently of the electrical means.

Another object is to provide automatic means to compensate for wear of the valve plug in its seat, and thus avoid loss of gas.

Other objects, advantages and features of invention may appear from the accompanying drawings, the subjoined detail description and the appended claims.

The accompanying drawings illustrate the invention in the form I at present deem preferable.

Figure 1 is an axial section on enlarged scale of a device constructed in accordance with this invention and with valve operating parts in normal position and the valve in full open or high position. Line $x^1$, Figs. 2 and 4 indicates the plane of section.

Fig. 2 is an end elevation of the device shown in Fig. 1.

Fig. 3 is a transverse section of the valve body on line $x^3$, Figs. 1 and 2.

Fig. 4 is a fragmental section on irregular line $x^4$—$x^4$, Figs. 1 and 2.

Fig. 5 is a section on irregular line $x^5$—$x^5$, Fig. 1.

Fig. 6 is a fragmental section analogous to Fig. 1, but showing the valve operating means in position when the circuit is closed in the magnetic coil, and the valve moved to low position.

Fig. 7 is an elevational detail view of the solenoid pole piece with extension.

Fig. 8 is a bottom end view of the pole piece extension.

Fig. 9 is a plan of the pole piece shown in Fig. 7.

Fig. 10 is an axial sectional view of the sleeve.

Fig. 11 is a detail view of the bottom bearing.

Fig. 12 is an end view of the bottom bearing.

Fig. 13 is a section on line $x^{13}$, Fig. 12.

Fig. 14 is a diagrammatic view showing the wiring of the device and the operating button and valve position indicating lights.

The valve 1 is of the stop cock type and comprises a body 2 provided with threaded ends 3, 4 to receive connecting pipes, not shown, to carry the flow of gas to and from the valve. The body is provided with a taper socket 5 in which is rotatably mounted a fitted and ground taper spigot 6 provided with a passageway 7 that is adapted, when full flow of gas is desired, to be brought into alinement with an enlarged orifice or elongated slot 8 in the central portion of the valve body 2; when the valve is in such position it is known as being in high or full open position. Said body 2 is also provided with a reduced orifice 9, spaced in the present instance 60° from the slot 8. The passageway 7 is adapted to be brought into alinement with the orifice 9 when a reduced flow of gas is desired, and such position will be hereinafter referred to as the low position of the valve.

Means are provided to control the flow of gas through the orifice 9 when the valve is turned to low position so as to adapt the valve to various grades or pressures of gas, and to regulate the flame of the burner to which the valve may be attached. Such means comprise a screw or auxiliary needle valve $a$ which is threaded into the body 2 and adapted to be regulated to open or close the inlet $b$ of the orifice 9. To prevent leakage of gas around said needle valve and to retain the same in adjusted position, I provide a jamb nut $c$ which is threaded onto the screw $a$ and is adapted to firmly press the packing $d$ around the threads of the screw $a$.

The spigot 6 is held in its seat 5 by an adjustable spring tension which automatically compensates for wear and keeps the spigot in a gas tight fit with its seat. This is accomplished by providing the spigot at its lower end with a button 10 connected thereto by a neck 11 which is adapted to be received in a slot 12 of a tension spring 13 which tends to pull downward on the spigot and hold said spigot in its seat. The tension of the spring 13 may be adjusted by means of a retaining screw 14. Loosening the screw increases the tension and tightening the screw decreases the tension.

The upper end of the spigot is provided with a slotted extension 15 which is adapted to be engaged by valve regulating means 16 that are fitted to a circular extension 17 of the valve body 2, and are arranged above, and in axial alinement with, the valve spigot.

The valve regulating means comprises a combined annular and thrust anti-friction bearing 18 having an outer ring 19 fitted to the inner surface of the extension 17, and an inner ring 29 adapted to receive the lower end of a sleeve 21, the upper end of which is enlarged and provided, as in the present instance with six equidistant spiral teeth 22; one side 23 of each tooth is straight and the other side of each tooth is provided with a cam or spiral surface 24.

The enlarged upper end of the sleeve forms a shoulder 25 which is adapted to engage and secure an insulated timing disk 26 between said shoulder and the inner ring 20 of the bearing 18. Said disc 26 comprises a non-conducting inner annulus 27 such as fibre, or the like, and a metallic outer annulus 28 that carries short and long contact posts 29, 30 respectively. The inner annulus 27 is thicker than the outer annulus 28 as shown in Figs. 1 and 6, so as to space the outer annulus 28 from the outer ring 19 of the bearing 18 to completely insulate the timing disc 26 from the surrounding parts. The lower end of the sleeve 21 is adapted to receive the extension 15 of the valve spigot and is provided with a cross member in the form of a steel wire 31 which fits into a slot 32 in said extension, thus forming a longitudinally adjustable and somewhat flexible coupling between the sleeve 21 and spigot 6.

A steel tube 33 is secured by screws 34 to the outside of the circular extension 17 in axial alinement with the spigot 6.

A solenoid 35 is mounted in the upper end of the tube 33 and comprises an externally and internally threaded hollow core 36 of non-magnetic material, steel end pieces 37, 38 that are threaded onto the core 36, and a coil 39 of copper wire that is insulated from the end pieces and tube 33 by any suitable insulating material 40, 41 and 42. The ends of the coil 39 are secured to posts 43, 44 in any well known way, the posts 43, 44 are insulated from the end piece 38 by means of fibre bushings 43', 44'. Screws 45 extending through the tube into the end pieces secure the solenoid in place in the tube.

The core 36 extends above the level of the end piece 37 as at 46 and forms a top bearing 47. The extending end 46 or top bearing is provided with an adjustably mounted shifting pin 49 in the form of a screw that is held in adjusted position by a lock nut 50. A bottom bearing 51 is provided with a portion 52 adapted to be threaded into the lower end of the core 36, a flange 53 that forms a wrench seat, and has at its lower end a series of cam surfaces or semi-spirals 54 arranged in opposite directions to the spiral surface 24 of the spiral teeth 22, the purpose of which spiral surfaces will be hereinafter explained. A lock nut 48 is threaded onto the threaded portion 52 of the bottom bearing and is adapted to lock such bearing in position after correct adjustment of the cam surfaces 54 in relation to the spiral surfaces 24 of the spiral teeth 22.

A steel pole piece 55 is mounted in axial alinement with the valve spigot and is slidably mounted in the top bearing 47 and is provided intermediate its ends with a stop or flange 56 that is adapted to engage the shoulder 47' formed in the core 36 to limit the upward travel of the pole piece. A longitudinal guideway 57 is formed in the periphery of the pole piece at the upper end thereof and a cam surface 58 is provided intermediate the ends of said guideway, the purpose of which will be more fully hereinafter explained. A non-magnetic pole piece extension 59 preferably of brass is fixed to the pole piece 55 and is slidably mounted in the bottom bearing 51 and provided at its lower end with projections 60 spaced equidistant from each other and which, as shown in Fig. 5, are three in number. The projections 60 are preferably of hardened metal such as steel to prevent wear thereof and have a tapered or inclined surface 60' which is adapted to cooperate with the spiral surface 24 of the spiral teeth 22, as will be hereinafter explained.

A spring 61 operates between the bottom bearing 51 and the flange 56 to retract the pole piece from valve turning position to the normal position shown in Fig. 1 when the solenoid current is broken, or pressure on the pole piece released.

The tube 33 is provided with line wire terminals 62, 63, 64, see Fig. 1. Each of these terminals comprise a spring contact member 65 mounted on the inside of tube 33 and secured thereto by means of a screw 66 that extends outward from the inside of the tube and serves as a binding post to receive the electric wires. A nut 67 secures the screw 66 in place and holds the spring contact member 65 in position. A lock nut 68 is threaded onto the screw 66 and is adapted to secure the electric wires between its inner surface and the nut 67. An insulating plug 69 threaded into the tube 33 insulates the terminals from the tube.

If desired, the solenoid may be inverted so that the posts 43, 44 will be accessible at the top of the tube 33, and thereby eliminate connecting the coil to the live wires through the terminals 62, 63.

The tube 33 is also provided with terminals 70, 71 constructed and insulated from said tube in a manner similar to the terminals 62, 63, 64, and are adapted to receive on the outside of the tube the wires leading to the lights which indicate the position of the valve.

The contact members 65 of the terminals 62, 63 are adapted to contact with the posts 43, 44 of the coil 39 as best shown in Fig. 5. The contact member 65 of the terminal 64 is adapted to contact with the periphery of the metallic outer annulus of the insulated timing disc 26 as best shown in Figs. 4 and 5. The contact member 72 of the terminal 70 is adapted to be engaged by the long contact posts 30 of the timing disc and the contact member 73 of the terminal 71 is adapted to be engaged by the short contact posts 29 of the timing disc.

The device may be connected to an electric circuit as shown in Fig. 14, in which the electric terminals and contacts of the device are diagrammatically illustrated. The register plate 74 indicated by dotted lines may be mounted in a convenient place in a room some distance from the valve and comprises a push button 75 and lamps of different colors such as for instance a white light 76, which, when lighted indicates the high position of the valve, and a red light 77 which, when lighted indicates the low position of the valve.

A source of electric energy 78 is connected by a line wire 79 to the terminal 63 which is connected by contact spring 65 of said terminal to the post 43 that is connected to one end of the coil 39, the other end of the coil is connected to the post 44 which is engaged by the contact 65 of the terminal 62 that is connected by wire 80 to one terminal 81 of the push button 75. Terminal 82 of the push button is connected by a line wire 83 to complete the circuit to the source of electricity 78. A spring 75' normally holds the push button 75 out of engagement with the terminals 81, 82.

To make connection between the lamps of the valve position indicating means and the timing disc, a line wire 84 is spliced onto wire 79 and connected to the terminal 64 which is connected by the contact 65 of said terminal to the insulated metallic outer annulus 28 and thereby energizes said annulus and the contact posts 29, 30.

When the annulus is rotated by movement of the valve to high position, one of the short posts 29 is brought into engagement with the contact 73 of the terminal 71 which is connected by wire 85 to one side of the white lamp 76, the other side of which is connected by wire 86 to the line wire 83. When the valve is moved to low position, one of the long contact posts 30 is brought into engagement with the contact member 72 of terminal 70 which is connected by wire 87 to one side of the red light 77 the other side of which is connected by wire 88 to the line wire 83.

I have shown and described this invention as being applied to a valve which may be successively turned to high, low, and off positions in one-sixth rotation of the valve spigot; but I do not wish to limit my invention to a valve with only these three positions. By changing the sleeve, lower bearing projections on the solenoid core extension, and posts on the timing disc, I may provide, by fitting the sleeve with four ratchet teeth, a valve which will operate as a two way valve, i. e., high and off; or by fitting the sleeve with eight ratchet teeth I may provide a valve which will operate as a four-way valve, i. e., high, medium, low, and off.

In operation with the valve in high position as shown in Fig. 1 the operator will push the button 75 to close the circuit between the terminals 81, 82 and thereby energize the coil 39, the magnetic force of which will draw the steel pole piece 55 toward the center of the coil thereby forcing the non-magnetic pole extension 59 downward. The inclined surfaces 60' of the projections 60 will engage the spiral surfaces 24 of the spiral teeth 22 and move the sleeve 21 in a direction that is called a right hand turn, and the valve spigot 6 will be turned in the same direction through the medium of the cross member 31 that fits into the slot 32 in the extension 15. When the pole piece has moved downward a sufficient distance so that the projections 60 have engaged the teeth 22, the cam surface 58 in the guideway 57 by coming into engagement with the shifting pin 49 will serve as means to partially accelerate or advance the rotation of the pole piece and its extension and thereby position the sleeve 21 so that its teeth 22 will be positively engaged by the next downward operation of the pole piece. When the circuit is broken by releasing the push button 75 the magnetic force on the pole piece 55 is released and the spring 61 and cam surfaces 54 will return the pole piece to normal position shown in Fig. 1.

During upward travel of the pole piece the projections 60 which have been turned in a right hand turn away from normal position are returned to such normal position by a partial left hand turn. This is because the projections 60 will engage the cam surfaces 54 and continued upward travel of the pole piece causes the projections to ride along the surfaces 54 and thus partially rotate the pole piece in a direction reverse to that caused by the cam surface 58 in the guideway 57, until the pole piece and projections are returned to the normal position shown in Fig. 1. In this position the projections 60 will have passed over the points of the spiral teeth and the operation of the valve is thus made positive at all times.

From the foregoing it will be seen that in case the source of electric energy should be cut off, the valve may be normally operated by pressing the pole piece downward by any manual means, such as the finger.

The valve position indicating lights are illuminated in the following manner. When the valve is in high position one of the contact posts 29 is brought into contact with the contact member 73 of the terminal 71 by rotation of the timing disc 26 which is fixed to the sleeve 21 and thereby closes the circuit to the white light 76 through wires 85, 86 and 83. The next operation of the pole piece will rotate the sleeve, spigot, and timing disc one-sixth of a revolution and bring the passageway 7 into alinement with the orifice 9 thus turning the valve into low position and bringing one of the posts 30 into contact with the contact member 72 of the terminal 70 and thereby closes the circuit to the red light 77 through wires 87, 88 and 83.

The next operation of the pole piece turns the spigot one-sixth of a revolution and closes the valve and none of the contact posts 29, 30 will contact with either of the contact members 72, 73 and thus when the valve is in this position, neither of the lights 76, 77 will be illuminated and the consumption of electricity will be eliminated whenever the valve is in off position.

I claim.

1. A valve comprising a body and a spigot in said body; a sleeve anti-frictionally mounted and connected to said spigot; a solenoid connected to an electric circuit and comprising a core; top and bottom bearings in said core; a pole piece slidably mounted in said bearings adapted to be moved into engagement with said sleeve to turn the spigot by completing the circuit to said solenoid; and means operable between said bearings to move said pole piece out of engagement with said sleeve when said circuit is broken.

2. A valve comprising a spigot having a slotted extension; a sleeve adapted to receive said extension and having a cross member adapted to be received in said slotted extension, said sleeve having teeth; a solenoid; and means operable by said solenoid and adapted to engage said teeth to turn said sleeve and spigot.

3. A valve comprising a spigot having a slotted extension; a sleeve adapted to receive said extension and having a cross member adapted to be received in said slotted extension, said sleeve having teeth; and means adapted to engage said teeth to turn said sleeves and spigot.

4. A valve comprising a spigot; a sleeve provided with teeth and being connected to said spigot; a tube; a member slidable in said tube and adapted to engage said teeth to turn said spigot; means to turn said member after said member has engaged said teeth; and means to turn said member in a direction reverse to that of the spigot after said member has been moved out of engagement with said teeth.

5. A valve comprising a body and a spigot having a passageway adapted to be brought into and out of alinement with an orifice in said body; a member connected to said spigot and having teeth; a slidable member in axial alinement with said spigot and adapted to be moved into engagement with said teeth; means whereby said slidable member on its downward movement is adapted to move said connected member and spigot so as to bring said passageway into or out of alinement with said orifice; and means to return said slidable member into position to successively engage said teeth to turn the spigot in the same direction by imparting to said slidable member a slight reverse rotation.

6. A valve comprising a spigot adapted to be moved to on and off positions; a member engaging said spigot to turn the same; a solenoid connected to an electric circuit and comprising a core; top and bottom bearings in said core; a pole piece slidably mounted in said bearings and having projections and a guideway provided with a cam surface; said pole piece being operable by said solenoid to bring said projections into engagement with said member to move the spigot into on or off position when the circuit to the solenoid is closed; means in said top bearing to accelerate the movement of said spigot; and cam surfaces on said lower bearing adapted to be engaged by said projections to move said pole piece in a direction opposite to that in which the spigot is moved.

7. A valve comprising a spigot adapted to be moved to on and off positions; a member engaging said spigot to turn the same; a solenoid connected to an electric circuit and comprising a core; top and bottom bearings in said core; a pole piece slidably mounted in said bearings and having projections and a guideway provided with a cam surface, said pole piece being adapted to be moved to bring said projections into engagement with said member to move the spigot into on or off position by closing the circuit to the solenoid; means in said top bearing to accelerate the movement of said spigot; cam surfaces on said lower bearing adapted to be engaged by said projections to move said pole piece in a direction opposite to that in which the spigot is moved; and a spring between said bearings to move said projections out of engagement with said member when the circuit to said solenoid is broken.

8. A valve having a body and a spigot in said body; and extension on said body; an anti-friction bearing mounted in said extension; a member carried by said bearing and connected to turn said spigot; and means adapted to engage and turn said member to turn said spigot.

9. A valve comprising a spigot, a member engaging said spigot and adapted to turn the same; a solenoid comprising a pole piece slidably mounted therein, projections on said pole piece adapted to engage said member to partially rotate the same, and cam surfaces adapted to be engaged by said projections to move said pole piece in a reverse direction to said member.

10. A valve comprising a spigot, a member engaging said spigot and adapted to turn the same; a solenoid comprising a pole piece slidably mounted therein, projections on said pole piece adapted to engage said member to partially rotate the same, cam surfaces adapted to be engaged by said projections to move said pole piece in a reverse direction to said member; and means engaging said pole piece to accelerate the rotation thereof.

11. A valve comprising a spigot, a member engaging said spigot and adapted to turn the same; a solenoid comprising a pole piece slidably mounted therein, projections on said pole piece adapted to engage said member to partially rotate the same, and cam surfaces adapted to be engaged by said projections to move said pole piece in a reverse direction to said member; said pole piece having a cam surface formed therein, a pin engaging said surface whereby a movement is imparted to said pole piece in the same direction to that imparted to the spigot.

12. In a valve which includes a rotatable plug, a plunger movable longitudinally towards and away from the plug, means for longitudinally moving the plunger, and members on the plug and plunger adapted to have spiral engagement during longitudinal movement of said plunger in one direction only, whereby said plunger, in its movement in said one direction, imparts rotary movement to said plug.

13. In a valve embodying a rotatable plug held against appreciable movement in the direction of its axis of rotation, a plunger, a plunger support in fixed relation with respect to the plug, said plunger being longitudinally movable through its support towards and away from the plug, means for longitudinally moving the plunger, and a member on the support adapted to have spiral engagement with the plunger during longitudinal movement of the plunger in one direction only, whereby said plunger in its movement in said one direction, only, imparts rotary movement to said plug.

In testimony whereof, I have hereunto set my hand at Los Angeles, California, this 18th day of May, 1923.

DONN OTTO MARKS.